United States Patent
Fujii

(10) Patent No.: US 10,234,029 B2
(45) Date of Patent: Mar. 19, 2019

(54) CONTROLLER OF OIL PRESSURE CONTROL SYSTEM FOR AUTOMATIC TRANSMISSION

(71) Applicant: DENSO CORPORATION, Kariya, Aichi-pref. (JP)

(72) Inventor: Hidenori Fujii, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/370,506

(22) Filed: Dec. 6, 2016

(65) Prior Publication Data

US 2017/0159810 A1    Jun. 8, 2017

(30) Foreign Application Priority Data

Dec. 7, 2015    (JP) .................................. 2015-238350

(51) Int. Cl.
*F16H 61/32* (2006.01)
*H02P 6/16* (2016.01)
*H02P 25/086* (2016.01)

(52) U.S. Cl.
CPC .............. *F16H 61/32* (2013.01); *H02P 6/16* (2013.01); *H02P 25/086* (2013.01); *F16H 2061/326* (2013.01)

(58) Field of Classification Search
CPC ....... F16H 2061/326; F16H 61/32; H02P 6/16
See application file for complete search history.

(56) References Cited

U.S. PATENT DOCUMENTS

| | | | | |
|---|---|---|---|---|
| 5,094,115 A | * | 3/1992 | Michihira | B60K 37/06 475/7 |
| 2001/0039227 A1 | * | 11/2001 | Kusafuka | F16H 59/08 475/149 |
| 2002/0134185 A1 | * | 9/2002 | Tsuzuki | F16H 61/32 74/473.1 |
| 2006/0081085 A1 | * | 4/2006 | Otsuka | F16H 59/10 74/473.21 |
| 2009/0292431 A1 | * | 11/2009 | Hoshino | F16H 61/12 701/62 |

(Continued)

FOREIGN PATENT DOCUMENTS

JP    2007-271036    10/2007

*Primary Examiner* — Muhammad S Islam
(74) *Attorney, Agent, or Firm* — Nixon & Vanderhye P.C.

(57) ABSTRACT

A controller of an oil pressure control system for an automatic transmission, the system including: a manual valve having a sleeve and a spool and changing an oil passage to the automatic transmission; a detent lever having engagement grooves and positioning the spool; an engagement member including an engagement unit for the grooves and a bias unit biasing the engagement unit; and a motor rotating the detent lever, comprises: a shift range detecting unit; a range switch determining unit determining whether the shift range is switched; a temperature detecting unit; a temperature determining unit determining whether environmental temperature is lower than a predetermined temperature; and a power controlling unit supplying, to the motor, power for setting a maximum value of a rotary torque of rotating the detent lever to be a predetermined value when the shift range is switched and the environmental temperature is lower than the predetermined temperature.

6 Claims, 5 Drawing Sheets

(56) References Cited

U.S. PATENT DOCUMENTS

| | | | |
|---|---|---|---|
| 2010/0168954 A1* | 7/2010 | Inoue | F16H 59/72 |
| | | | 701/31.4 |
| 2010/0256880 A1* | 10/2010 | Sato | F16H 59/105 |
| | | | 701/55 |
| 2013/0110364 A1* | 5/2013 | Yamada | F16H 61/68 |
| | | | 701/61 |
| 2014/0015467 A1* | 1/2014 | Kimura | G05B 5/01 |
| | | | 318/603 |
| 2014/0139171 A1 | 5/2014 | Yoshida et al. | |

* cited by examiner

CONTROLLER OF OIL PRESSURE CONTROL SYSTEM FOR AUTOMATIC TRANSMISSION

CROSS REFERENCE TO RELATED APPLICATION

This application is based on Japanese Patent Application No. 2015-238350 filed on Dec. 7, 2015, the disclosure of which is incorporated herein by reference.

TECHNICAL FIELD

The present disclosure relates to a controller of an oil pressure control system for an automatic transmission.

BACKGROUND

There has been known an oil pressure control system for an automatic transmission, which supplies hydraulic oil to an automatic transmission for automatically shifting gears of a vehicle by engaging or releasing a plurality of clutches and brakes in accordance with a shift range selected by a driver of the vehicle. The oil pressure control system for the automatic transmission includes: a manual valve having a sleeve with a plurality of openings connected to the clutches and the brakes, and a spool reciprocally inserted in the sleeve; a detent lever; an engagement member; a motor; and the like. In the oil pressure control system for the automatic transmission, an oil passage for hydraulic oil to be supplied to the clutch and the brake is changed by positioning of the spool with respect to the sleeve. The positioning of the spool with respect to the sleeve is performed by engaging the engagement member, which is coupled to the spool, with any of a plurality of engagement grooves in the detent lever. That is, a quantity and pressure of the hydraulic oil to be supplied to the clutch and the brake are decided in accordance with the engagement position between the detent lever and the engagement member. A motor capable of rotating the detent lever is provided in the oil pressure control system for the automatic transmission. The motor adjusts the engagement position between the detent lever and the engagement member. For example, Patent Literature 1 describes a controller of an oil pressure control system for an automatic transmission in which, when a shift range is switched, a detent lever is rotated within a predetermined stop range based on a count value of a pulse signal of an encoder for detecting a rotation angle of a motor, and thereafter, the motor is driven in minute steps until the count value becomes a target count value.

Patent Literature 1: JP-2014-101919-A (corresponding to US 2014/0139171 A1)

SUMMARY

The above described target count value may not correspond to the bottom of an engagement groove due to variation in processing accuracy of the detent lever and an engagement member, a rattle in combination of a plurality of members, or the like. In this case, since the motor is just rotated until the count value becomes the target count value, the engagement member cannot move to the bottom of the engagement groove. For this reason, the engagement member moves to the bottom of the engagement groove along the shape of the engaged groove by biased force that can move the engagement member to the bottom of the engagement groove. However, with the detent lever, the engagement member, and the like soaked in hydraulic oil, when the hydraulic oil has relatively high viscosity, the engagement member may not be able to move to the bottom of the engagement groove depending on the biased force. For this reason, the positioning of the spool with respect to the sleeve cannot be performed with high accuracy.

It is an object of the present disclosure to provide a controller of an oil pressure control system for an automatic transmission that improves the accuracy in positioning of a spool with respect to a sleeve in a manual valve.

According to an aspect of the present disclosure, a controller of an oil pressure control system for an automatic transmission, the oil pressure control system including: a manual valve having a sleeve and a spool reciprocally accommodated in the sleeve, and changing an oil passage for hydraulic oil to be supplied to the automatic transmission for automatically shifting a gear of a vehicle; a detent lever that is rotatably arranged and coupled to the spool, has a plurality of engagement grooves, and positions the spool with respect to the sleeve; an engagement member including an engagement unit engageable with the plurality of engagement grooves, and a bias unit that is not relatively displaceable with respect to the sleeve, and biases the engagement unit in a direction of a rotation center of the detent lever; and a motor rotating the detent lever, the controller includes: a shift range detecting unit that detects a shift range selected by a driver of the vehicle, and outputs a signal in accordance with the shift range; a range switch determining unit that is electrically connected with the shift range detecting unit, and determines based on the signal outputted by the shift detection unit whether the shift range is switched; a temperature detecting unit that detects an environmental temperature of the detent lever, and outputs a signal in accordance with detected environmental temperature; a temperature determining unit that is electrically connected with the temperature detecting unit, and determines based on the signal outputted by the temperature detecting unit whether the environmental temperature of the detent lever is lower than a predetermined temperature; and a power controlling unit that is electrically connected with the range switch determining unit and the temperature determining unit, and supplies, to the motor, power for setting a maximum value of a rotary torque of rotating the detent lever to be a predetermined value when the range shift determining unit determines that the shift range is switched and the temperature determining unit determines that the environmental temperature of the detent lever is lower than the predetermined temperature.

In the controller of the oil pressure control system for the automatic transmission according to the present disclosure, when the shift range is switched and the environmental temperature of the detent lever is lower than the predetermined temperature, the maximum value of the rotary torque for rotating the detent lever is assumed to be the predetermined value. By rotation of the detent lever that is rotated by the motor with the maximum value of the rotary torque limited to the predetermined value, the engagement member remaining on the inner wall of the engagement groove can move in the direction to the bottom of the engagement groove, but the engagement member once having reached the bottom of the engagement groove cannot again move along the inner wall of the engagement groove. Accordingly, even when the hydraulic oil has such a relatively high viscosity that the engagement member cannot move by biased force, it is possible to move the engagement member to the bottom of the engagement groove and reliably position the engagement member at the bottom of the engagement groove. It is thereby possible to improve the accuracy in positioning of the spool with respect to the sleeve in the manual valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
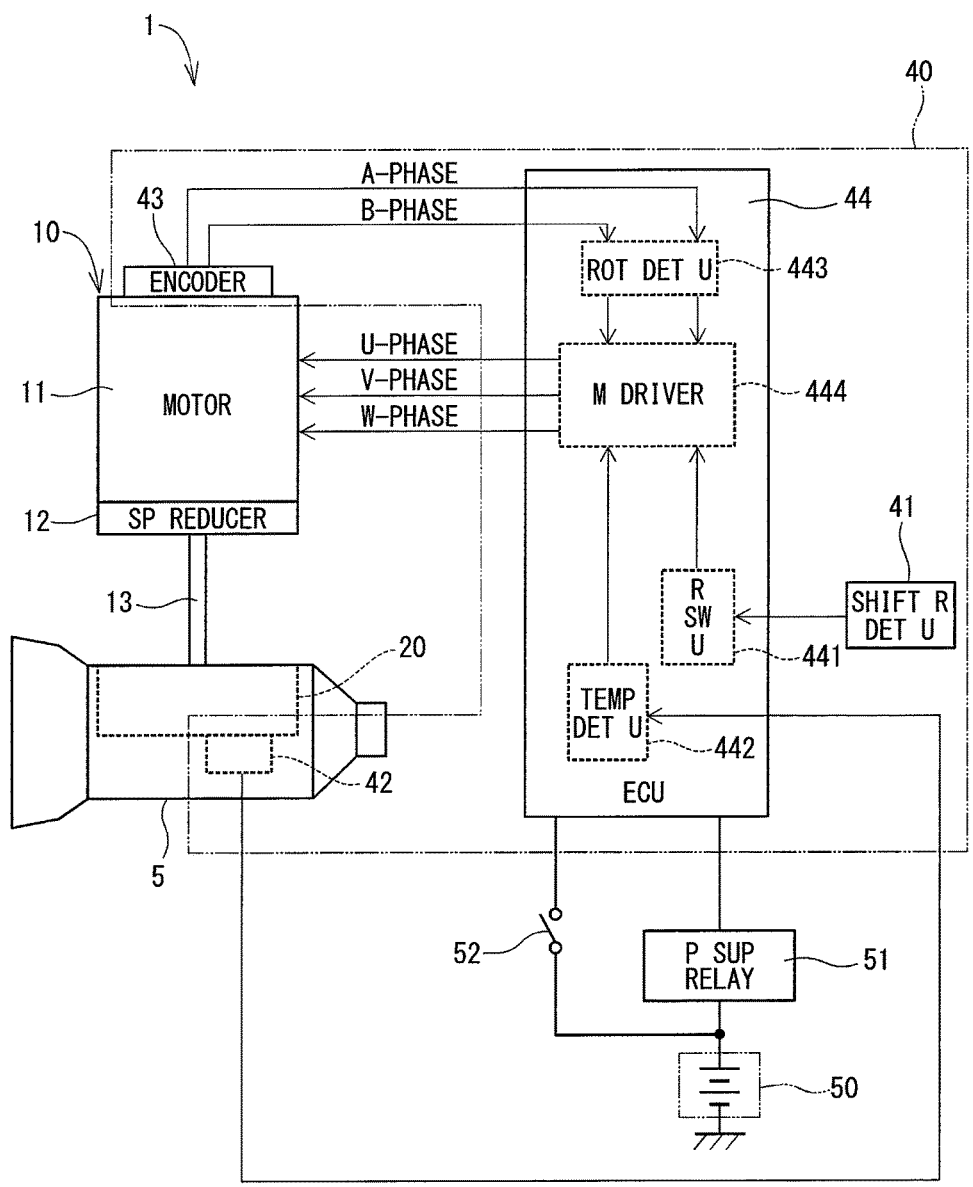
FIG. 1 is a schematic view of an oil pressure control system for an automatic transmission, which is applied with a controller of an oil pressure control system for an automatic transmission according to one embodiment of the present disclosure.

FIGS. 1 to 5 show a controller of an oil pressure control system for an automatic transmission according to one embodiment of the present disclosure. An oil pressure control system 1 for an automatic transmission includes an actuator 10, a shift range switching unit 20, a parking lock unit 30, and a control unit 40 as the "controller of the oil pressure control system for the automatic transmission." The oil pressure control system 1 for the automatic transmission controls engagement or cancellation of a plurality of clutches and brakes, not shown, in an automatic transmission 5 in accordance with a shift range selected by a driver.

The actuator 10 includes a motor 11, a speed reducer 12, and the like.

The motor 11 generates rotary torque when receiving supply of power. The motor 11 is a switched reluctance motor, for example. As shown in FIG. 1, power is supplied to the motor 11 from a battery 50 mounted in a vehicle, not shown, via the control unit 40. The rotary torque generated by the motor 11 is transmitted to the shift range switching unit 20 via an output shaft 13.

The speed reducer 12 is provided between the motor 11 and the output shaft 13. The speed reducer 12 can reduce the number of rotation of the rotary torque that is outputted by the motor 11.

Figure 2:
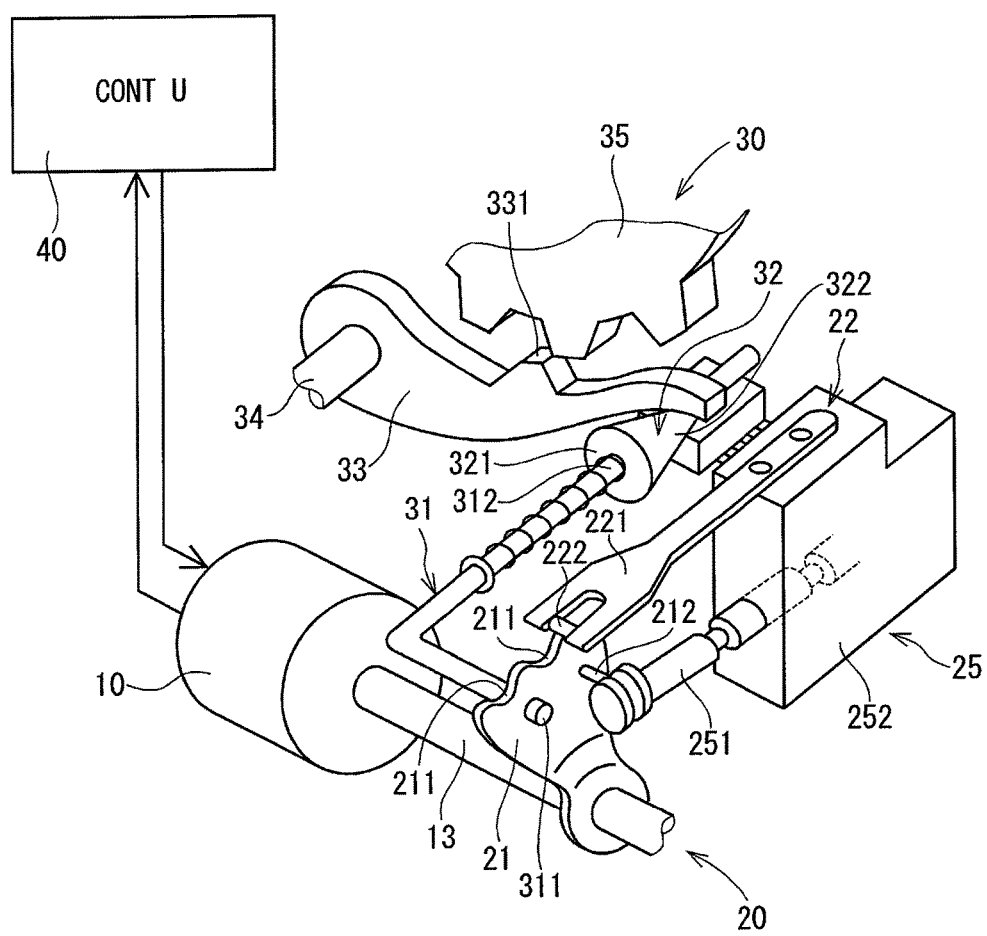
FIG. 2 is a perspective view of the oil pressure control system for the automatic transmission, which is applied with the controller of the oil pressure control system for the automatic transmission according to one embodiment of the present disclosure.

As shown in FIG. 2, the shift range switching unit 20 includes a detent lever 21, a detent spring 22 as the "engagement member", and the like. The shift range switching unit 20 is coupled to a manual valve 25 capable of switching an oil passage for hydraulic oil to be supplied to a plurality of clutches and brakes.

The detent lever 21 is a platy member protruding radially outward from one end of the output shaft 13. The detent lever 21 has a plurality of engagement grooves 211 at a protruding end. The plurality of engagement grooves 211 are formed so as to correspond to the number and positions of shift ranges of the vehicle. For example, in FIG. 2, an engagement groove 211 located the most apart from the manual valve 25 corresponds to a parking range, and engagement grooves 211, located in order from the engagement groove 211 corresponding to the parking range, correspond to a reverse range, a neutral range, and a drive range.

Further, the detent lever 21 has an engagement protrusion 212 that protrudes in a direction parallel to an extending direction of the output shaft 13. The engagement protrusion 212 is coupled to a spool 251 in the manual valve 25. The spool 251 is reciprocally inserted in a valve body 252 as the "sleeve" in the manual valve 25. When the detent lever 21 rotates around the output shaft 13 as a rotation shaft, the spool 251 reciprocates with respect to the valve body 252. This makes a plurality of openings in the valve body 252 communicated or blocked, to change the supply of the hydraulic oil to the clutch and the brake. As thus described, in the shift range switching unit 20, the rotation motion of the actuator 10 is converted to linear motion via the output shaft 13 and the detent lever 21. When the spool 251 reciprocates in the valve body 252 by the linear motion, the oil passage for the hydraulic oil to be supplied to the clutch and the brake is switched. When the engagement state of the clutches and the brakes is switched by switching the oil passage, the shift range of the automatic transmission 5 is changed.

The detent spring 22 is relatively immovably provided on the valve body 252 of the manual valve 25. The detent spring 22 includes a platy member 221 as the "bias unit", and a detent roller 222 as the "engagement unit." One end of the platy member 221 is fixed to the valve body 252. The platy member 221 is formed to be elastically deformable in a radial direction of the detent lever 21. The detent roller 222 is provided at the other end of the platy member 221. The detent roller 222 can be engaged into any of the engagement grooves 211.

In the detent spring 22, the detent roller 222 is biased in a direction of the rotation center of the detent lever 21. When the rotary torque not smaller than a predetermined value is applied to the detent lever 21, the platy member 221 is elastically deformed from one of the plurality of engagement grooves 211 to another engagement groove 211 that is different from the one engagement groove 211. When the detent roller 222 is engaged with any of the engagement grooves 211, the rotation of the detent lever 21 around the output shaft 13 as the rotation center is regulated. Hence, while a relative position of the spool 251 with respect to the valve body 252 is fixed, the state of the parking lock unit 30 is decided, and the shift range of the automatic transmission 5 is fixed.

The parking lock unit 30 includes a parking rod 31, a conical body 32, a parking lock pole 33, an axial unit 34, and a parking gear 35.

The parking rod 31 is formed in a substantially L-shape. One end 311 of the parking rod 31 is fixed to the detent lever 21. The conical body 32 is provided at the other end 312 of the parking rod 31.

The other end 312 of the parking rod 31 is provided on a bottom surface 321 of the conical body 32. That is, the conical body 32 is formed so as to have a smaller diameter as more separating from the other end 312 of the parking rod 31. The conical body 32 is provided movably in an axial direction of the conical body 32 upon rotation of the detent lever 21.

The parking lock pole 33 is provided so as to abut on a conical surface 322 of the conical body 32. Further, the parking lock pole 33 is provided rotatably around the axial unit 34. A projection 331 engageable with the parking gear 35 is formed on the parking gear 35 side of the parking lock pole 33.

The parking gear 35 is provided on an axle, not shown, and provided engageably with the parking lock pole 33. When the parking gear 35 is engaged with the parking lock pole 33, the rotation of the axle is regulated. Therefore, when the shift range is any range but the parking range, the parking gear 35 is not locked by the parking lock pole 33, and the rotation of the axle is thus not inhibited by the parking lock unit 30. When the shift range is the parking range, the parking gear 35 is locked by the parking lock pole 33, and the rotation of the axle is thus regulated.

The control unit 40 is made up of a shift range detecting unit 41, a temperature detecting unit 42, an encoder 43, and ECU 44, and the like.

The shift range detecting unit 41 detects an operation position of a shift switch that is not shown and is operated by the driver. The shift range detecting unit 41 outputs, to the ECU 44, a signal in accordance with the detected operation position of the shift switch.

The temperature detecting unit 42 is a temperature sensor provided in the shift range switching unit 20, and detects the hydraulic oil in the shift range switching unit 20, namely, an environmental temperature of the detent lever 21. The temperature detecting unit 42 outputs, to the ECU 44, a signal in accordance with the detected temperature of the hydraulic oil.

The encoder 43 is provided so as to detect the rotation position of the motor 11. The encoder 43 is, for example, a magnetic rotary encoder and is formed of a rotation body in the motor 11, such as a magnet rotating together with a rotor, a hole IC for magnetism detection, and the like. The encoder 43 outputs an A-phase pulse signal and a B-phase pulse signal for each predetermined angle in synchronization with the rotation of the rotor (cf. FIG. 1). The encoder 43 outputs the pulse signal to the ECU 44.

The ECU 44 is made up of a microcomputer including a CPU, a ROM, a RAM, and the like, not shown. The ECU 44 includes a range switch determining unit 441, a temperature determining unit 442, a rotation determining unit 443, and a motor driver 444 as the "power controlling unit." The ECU 44 is electrically connected with the motor 11, the encoder 43, the shift range detecting unit 41, the temperature detecting unit 42, and the battery 50. The ECU 44 is supplied with power from the battery 50 mounted in the vehicle via a power supply relay 51. When an ignition switch 52 being a start switch is turned on, the power supply relay 51 is turned on, and the power is supplied to the ECU 44. When the ignition switch 52 is turned off, the power supply relay 51 is turned off, and the power supply to the ECU 44 is shut off.

The range switch determining unit 441 is electrically connected with the shift range detecting unit 41. The range switch determining unit 441 determines whether the shift range has been switched based on the signal outputted by the shift range detecting unit 41. The range switch determining unit 441 outputs a signal in accordance with the determination result to the motor driver 444.

The temperature determining unit 442 is electrically connected with the temperature detecting unit 42. The temperature determining unit 442 determines whether the temperature of the hydraulic oil, which is also the environmental temperature of the detent lever 21, is lower than a predetermined temperature based on the signal outputted by the temperature detecting unit 42. The temperature determining unit 442 outputs a signal in accordance with the determination result to the motor driver 444.

The rotation determining unit 443 is electrically connected to the encoder 43. The rotation determining unit 443 counts a rising edge and a falling edge of each of the A-phase signal and the B-phase signal outputted by the encoder 43. The rotation determining unit 443 determines whether the counted value (hereinafter referred to as "encoder value") is within a predetermined range or a predetermined encoder value within the predetermined range. The rotation determining unit 443 outputs a signal in accordance with the determination result to the motor driver 444.

The motor driver 444 is electrically connected with the motor 11, the range switch determining unit 441, the temperature determining unit 442, and the rotation determining unit 443. The motor driver 444 outputs a drive signal concerning current application to each phase (U-phase, V-phase, W-phase) of the motor 11. The motor driver 444 controls rotary drive of the motor 11 based on the signals outputted by the range switch determining unit 441, the temperature determining unit 442, and the rotation determining unit 443.

Figure 3:
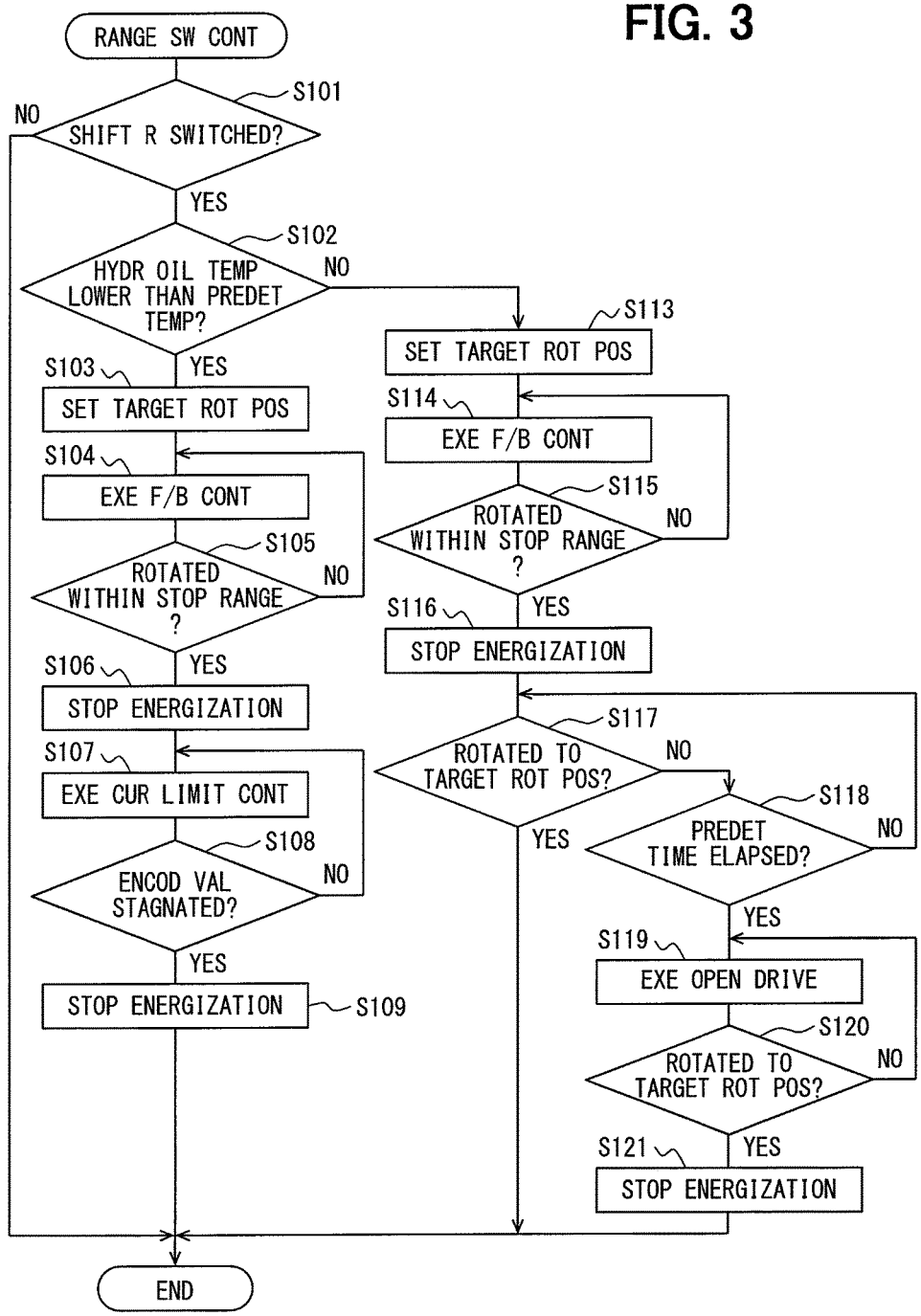
FIG. 3 is a flowchart of a controlling method in the controller of the oil pressure control system for the automatic transmission according to one embodiment of the present disclosure.
Figure 4A:
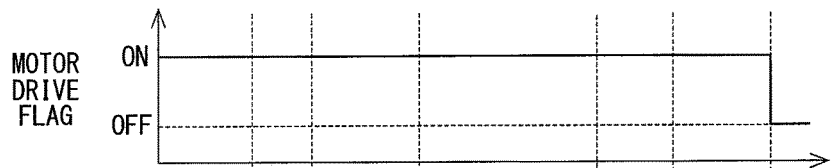
FIGS. 4A to 4D are characteristic diagrams of the controlling method in the controller of the oil pressure control system for the automatic transmission according to one embodiment of the present disclosure.
Figure 4B:
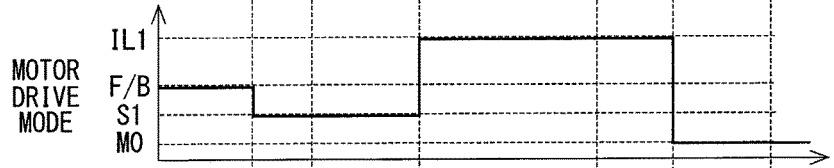
Figure 4C:
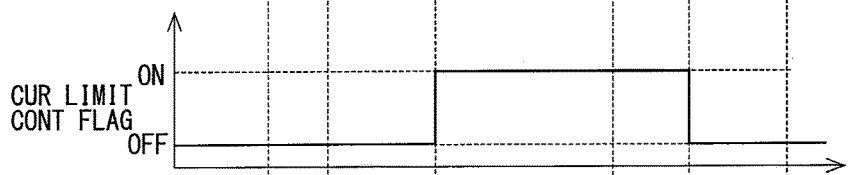
Figure 4D:
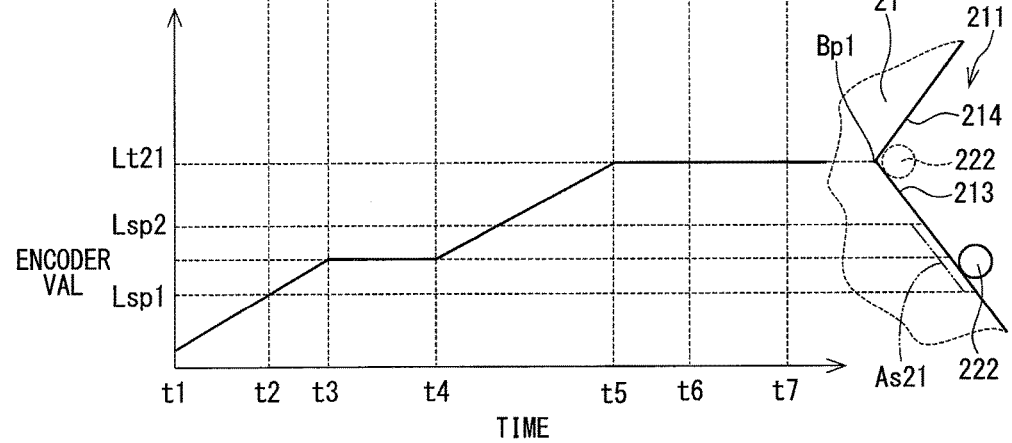
Figure 5:
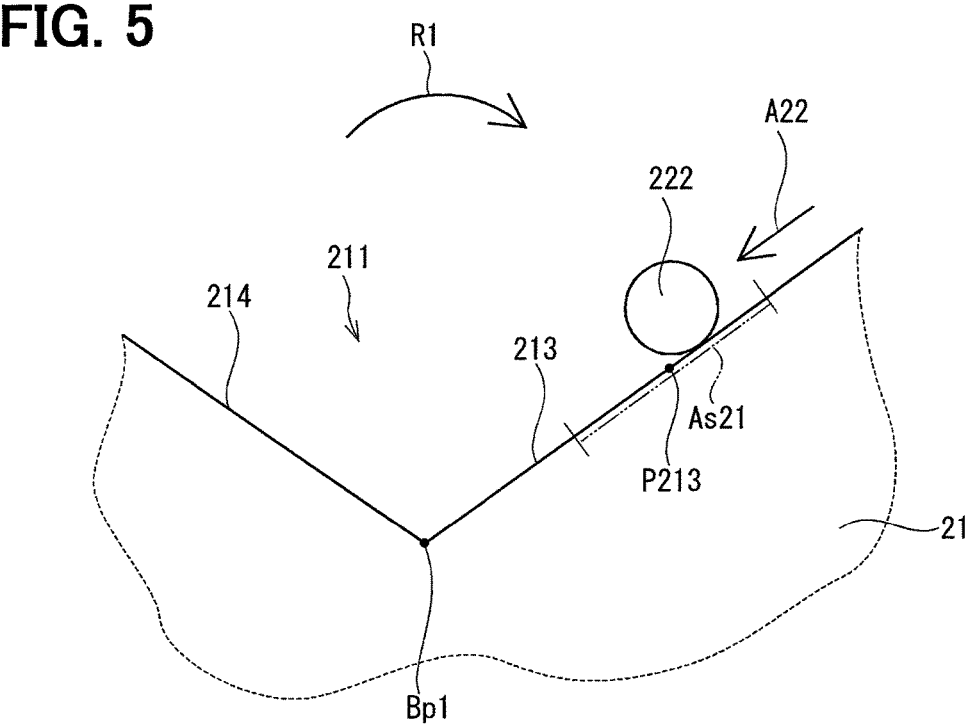
FIG. 5 is a schematic view for explaining an action in the controller of the oil pressure control system for the automatic transmission according to one embodiment of the present disclosure.
Figure 6:
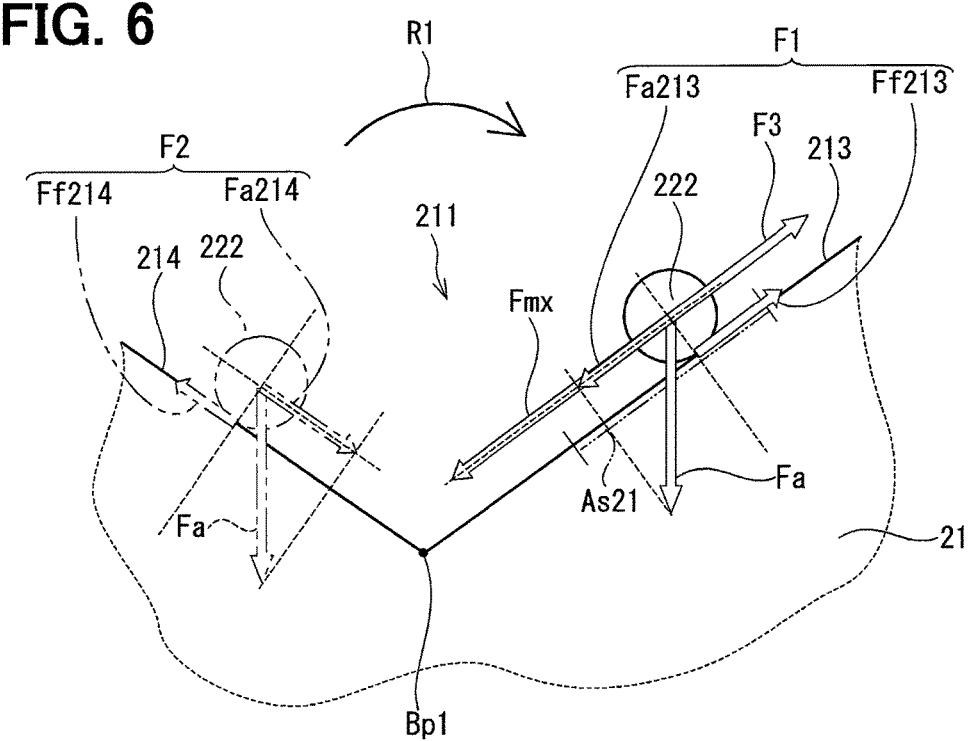
FIG. 6 is a schematic view for explaining an action in the controller of the oil pressure control system for the automatic transmission according to one embodiment of the present disclosure, and is a schematic view different from FIG. 5.

Next, a drive controlling method for the motor 11 in the control unit 40 is described with reference to FIGS. 3 to 6. FIG. 3 shows a flowchart of the drive control for the motor 11 in the control unit 40. FIGS. 4A to 4D show a temporal change in characteristics of each unit in the drive control for the motor 11 in the control unit 40. FIG. 4A shows a temporal change in drive flag of the motor 11. FIG. 4B shows a temporal change in drive mode of the motor 11. FIG. 4C shows a temporal change in current limit control flag in the ECU 44. FIG. 4D shows a temporal change in encoder value. Further, FIG. 4D schematically shows, along with the encoder value, relative positions of the detent lever 21 and the detent roller 222 which correspond to the encoder value. The schematic view shown in FIG. 4D represents the position of the detent roller 222 with respect to one engagement groove 211 in the detent lever 21. FIGS. 5 and 6 each show a schematic view of the relative positions of the detent lever 21 and the detent roller 222.

A routine of the flowchart shown in FIG. 3 is executed when the ignition switch 52 is turned on. When the ignition switch 52 is turned on, the motor 11 is rotated such that the detent roller 222 abuts on the inner wall of the engagement groove 211 located at one end corresponding to the parking range, or the inner wall of the engagement groove 211 located at the other end corresponding to the parking range, out of the plurality of engagement grooves 211. The control unit 40 counts the encoder value by taking as a reference value a position at which the detent roller 222 abuts on the inner wall of the engagement groove 211 located at one end corresponding to the parking range, or the inner wall of the engagement groove 211 located at the other end corresponding to the drive range. The control unit 40 then controls the rotation angle of the motor 11.

First, in Step (hereinafter simply referred to as "S") 101, it is determined whether the shift range has been changed. In the control unit 40, the range switch determining unit 441 determines whether the shift range has been switched based on the signal outputted by the shift range detecting unit 41. When the range switch determining unit 441 determines that the shift range has been switched, the process proceeds to S102. When the range switch determining unit 441 determines that the shift range has not been switched, the present routine is completed.

Next, in S102, it is determined whether the temperature of the hydraulic oil is lower than the predetermined temperature. In the control unit 40, the temperature determining unit 442 determines whether the temperature of the hydraulic oil is lower than the predetermined temperature, based on the signal outputted by the temperature detecting unit 42. When the temperature determining unit 442 determines that the temperature of the hydraulic oil is lower than the predetermined temperature, the process proceeds to S103. When the temperature determining unit 442 determines that the temperature of the hydraulic oil is not lower than the predetermined temperature, the process proceeds to S113.

When the temperature determining unit 442 determines that the temperature of the hydraulic oil is lower than the predetermined temperature in S102, a target rotation position of the motor 11 is set in S103. Specifically, in the ECU 44, the target rotation position corresponding to the switched shift range is set. The target rotation position set in S103 is described with reference to FIG. 5. FIG. 5 is a schematic view showing a state where the detent roller 222 is moving in one engagement groove 211 of the detent lever 21 that rotates in a direction of a solid-line arrow R1. In the actual shift range switching unit 20, while the detent roller 222 is supported by the platy member 221 fixed to the manual valve 25, the detent lever 21 is rotating by rotary torque generated by the motor 11. However, for the convenience of the description, the figure shows the detent roller 222 as if moving on the detent lever 21.

In FIG. 5, when the detent lever 21 rotates in the direction of the solid-line arrow R1, the detent roller 222 moves in a direction of a solid-line arrow A22 along an inner wall surface 213 as the "front-side inner wall surface"), namely in a direction toward a bottom Bp1 of the engagement groove 211. Here, the inner wall surface 213 is an inner wall that forms the engagement groove 211 more front than the bottom Bp1 of the engagement groove 211 to be engaged with the detent roller 222 being engaged in the detent lever 21 as seen from the detent roller 222. The bottom Bp1 is a position where the inner wall surface 213 and an inner wall surface 214 as the "rear-side inner wall", which form the engagement groove 211, intersect with each other, and is the closest position to the output shaft 13 that is the rotation center of the detent lever 21 in the engagement groove 211. Here, the inner wall surface 214 is an inner wall that forms the engagement groove 211 on a more rear side than the bottom Bp1 of the engagement groove 211 to be engaged with the detent roller 222 being engaged in the detent lever 21 as seen from the detent roller 222. In practice, the detent roller 222 does not reach the bottom Bp1 so as to overlap the bottom Bp1, but for the sake of convenience, it is mentioned that "the detent roller 222 reached the bottom Bp1" when the detent roller 222 reaches the closest position to the output shaft 13 being the rotation center of the detent lever 21.

The target rotation position set in S103 is a point on the inner wall surface 213 and is a point passed by the detent roller 222 that moves toward the bottom Bp1, for example, a pass point P213 in FIG. 5. The pass point P213 is included in a range set on the inner wall surface 213, as well as a range not including the bottom Bp1 (a range of a two-dot chain line As21 shown in FIG. 5, which is hereinafter referred to as "stop range As21"). The stop range As21 can be shown as a range between an encoder value Lsp1 and an encoder value Lsp2 in FIG. 4D. In S103, the target rotation position as thus defined is set in the motor driver 444. The stop range As21 corresponds to the "predetermined range."

Next, in S104, the control unit 40 executes feedback (hereinafter referred to as "F/B") control. In S104, the motor 11 is driven such that the rotation position of the detent lever 21 is the target rotation position set in S103 (after time t1 in FIGS. 4A to 4D).

Next, in S105, it is determined whether the detent lever 21 rotates within the stop range As21. In S104, as shown in FIG. 4D, the encoder value of the detent lever 21 being rotated by the motor 11 that is driven in an F/B control mode enters the stop range As21. In S105, based on the encoder value, the rotation determining unit 443 determines whether the detent lever 21 has rotated within the stop range As21. When the rotation determining unit 443 determines that the detent lever 21 has rotated within the stop range As21, the process proceeds to S106. When the rotation determining unit 443 determines that the detent lever 21 has not rotated within the stop range As21, the process returns to S104 to re-execute the F/B control.

When the rotation determining unit 443 determines that the encoder value is within the stop range As21 in S105, the motor driver 444 stops the current application (i.e., energization) to the motor 11 in S106. Specifically, as shown in FIG. 4D, when the encoder value becomes the encoder value Lsp1 at a time t2, the drive mode of the motor 11 is shifted from the F/B control mode (F/B shown in FIG. 4B) to a mode for stopping the switching of the current application phase (S1 shown in FIG. 4B). At this time, the detent lever 21 continues to rotate to some extent due to inertia, and the encoder value thus changes. When the inertia disappears caused by the resistance of the hydraulic oil, and the like, the detent lever 21 completely stops (time t3 in FIG. 4D). At this time, the encoder value stops changing (between time t3 and time t4 in FIG. 4D).

Next, in S107, the motor driver 444 executes current limit control. In S107, when a predetermined time, for example the time from the time t3 to the time t4, elapses after the encoder value stops changing, current limit control is executed. The current limit control is described here with reference to FIG. 6.

FIG. 6 is a schematic view showing a state where the detent roller 222 is stopped within the stop range in one engagement groove 211 of the rotating detent lever 21. That is, FIG. 6 is a schematic view showing a state continued from FIG. 5, and is specifically a schematic view showing a state at the time t4 in FIGS. 4A to 4D. As shown in FIG. 6, sucking force F1 is acting on the detent roller 222 being stopped in the stop range As21 such that the detent roller 222 moves toward the bottom Bp1. The sucking force F1 is acting force obtained, for example, by synthesizing friction force Ff213 between the detent roller 222 and the inner wall surface 213 with divided force Fa213 in a direction parallel to the inner wall surface 213, divided from biasing force Fa of the platy member 221 biasing the detent roller 222 in the direction of the rotation center of the detent lever 21. Further, due to the presence of the hydraulic oil around the detent roller 222, acting force F3 based on viscosity resistance of the hydraulic oil is acting on the detent roller 222 in the opposite direction to the sucking force F1. In S107, with the temperature of the hydraulic oil lower than the predetermined temperature, the viscosity resistance becomes relatively large, and the acting force F3 is larger than the sucking force F1. Hence, the detent roller 222 cannot reach the bottom Bp1 only by the sucking force F1.

Accordingly, in S107, the motor driver 444 controls the drive of the motor 11, while taking rotary torque as the maximum torque as the "predetermined value", the rotary torque being outputted by the motor 11 at the time when the detent lever 21 rotates such that the acting force Fmx derived by Relational Expression (1) below acts on the detent roller 222:

$$F3-F1<Fmx<F3+F2 \qquad (1)$$

The sucking force F2 is acting force obtained, for example, by synthesizing friction force Ff214 between the detent roller 222 and the inner wall surface 214 with divided force Fa214 in a direction parallel to the inner wall surface 214, divided from the biasing force Fa of the platy member 221 biasing the detent roller 222 in the direction of the rotation center of the detent lever 21. Note that the sucking force F1, F2 and the acting force F3, Fmx in Relational Expression (1) is each represented by a scalar quantity. After the time t4, when the motor driver 444 drives the motor 11 by a current limit control mode (IL1 shown in FIG. 4B), the detent roller 222 moves in the direction to the bottom Bp1 against the acting force F3 on the basis of the viscosity resistance of the hydraulic oil.

Next, in S108, it is determined whether the encoder value is stagnating. In the current limit control mode, the detent roller 222 moves in the direction to the bottom Bp1 little by little. At this time, the ECU 44 is constantly monitoring a change in encoder value. Since only the rotary torque smaller than the total of the acting force F3 and the sucking force F2 acts on the detent roller 222 having reached the bottom Bp1 along the inner wall surface 213 as shown in Relational Expression (1), the detent roller 222 is unable to pass through the bottom Bp1 or move up the inner wall surface 214. Hence, the detent roller 222 stops at the bottom Bp1. At this time, the encoder value stagnates at an encoder value Bp1 as the "predetermined encoder value" (time t5 to time t6 in FIGS. 4A to 4D). When the rotation determining unit 443 determines that the encoder value is stagnating, the process proceeds to Step S109. When the rotation determining unit 443 determines that the encoder value is not stagnating, the process returns to S108, to execute the current limit control.

When the rotation determining unit 443 determines that the encoder value is stagnating in S108, the current application (i.e., energization) to the motor 11 is stopped in S109. Specifically, at the time t6 in FIGS. 4A to 4D, the control mode for the motor 11 is switched from the current limit control mode to a current application stop mode (M0 shown in FIG. 4B), to stop the power supply to the motor 11. Thereafter, the drive flag of the actuator 10 is turned off, to complete the present routine.

Meanwhile, when the temperature determining unit 442 determines that the temperature of the hydraulic oil is not lower than the predetermined temperature in S102, the target rotation position of the motor 11 is set in S113. In the ECU 44, the target rotation position corresponding to the switched shift range is set. At this time, the target rotation position set in S113 is different from that in S103, but is an encoder value corresponding to the bottom Bp1 of the engagement groove 211.

Next, in S114, similarly to S104, the control unit 40 executes the F/B control. In S114, the motor 11 is driven such that the rotation position of the detent lever 21 is the target rotation position set in S113.

Next, in S115, similarly to S105, it is determined whether the detent lever 21 rotates within the stop range As21. When the rotation determining unit 443 determines that the encoder value is within the stop range As21, the process proceeds to Step S116. When the rotation determining unit 443 determines that the encoder value is not within the stop range, the process returns to S114 to execute the F/B control.

When the rotation determining unit 443 determines that the encoder value is within the stop range As21 in S115, the motor driver 444 stops the current application (i.e., energization) to the motor 11 in S116 as in S106. At this time, the detent lever 21 continues to rotate to some extent due to inertia, but when the inertia disappears caused by the resistance of the hydraulic oil, and the like, the detent lever 21 completely stops.

Next, in S117, it is determined whether the motor 11 has rotated to the target rotation position. The rotation determining unit 443 determines whether the motor 11 has rotated to the target rotation position set in S113 based on the encoder value. When the rotation determining unit 443 determines that the motor 11 has rotated to the target rotation position, the drive flag of the actuator 10 is turned off, to complete the present routine. When the rotation determining unit 443 determines that the motor 11 has not rotated to the target rotation position, the process proceeds to S118.

When the rotation determining unit 443 determines in S117 that the motor 11 has not rotated to the target rotation position, the motor driver 444 determines in S118 whether predetermined time after the stoppage of the current application to the motor 11, for example sufficient time for the motor 11 to rotate to the target rotation position, has elapsed. When the rotation determining unit 443 determines that the predetermined time has elapsed after the stagnation of the encoder value, the process proceeds to S119. When the rotation determining unit 443 determines that the predetermined time has not elapsed after the stagnation of the encoder value, the process returns to S117, and it is determined whether the motor 11 has rotated to the target rotation position.

When the rotation determining unit 443 determines in S118 that the predetermined time has not elapsed after the stagnation of the encoder value, open drive is executed in S119. Specifically, the motor driver 444 sequentially switches a current application phase of the motor 11 to move the encoder value by one account. A rotation angle of the detent lever 21 that corresponds to this one count corresponds to the "predetermined angle."

Next, in S120, it is determined whether the motor 11 has rotated to the target rotation position. The rotation determining unit 443 determines whether the motor 11 has rotated to the target rotation position by the open drive for one count in S119. When the rotation determining unit 443 determines that the encoder value has rotated to the target rotation position, the process proceeds to S121. When the rotation determining unit 443 determines that the encoder value has not rotated to the target rotation position, the process returns to S119, and the motor driver 444 executes the open drive.

When the rotation determining unit 443 determines in S120 that the motor 11 has rotated to the target rotation position, the current application (i.e., energization) to the motor 11 is stopped in S121. Thereafter, the drive flag of the actuator 10 is turned off, to complete the present routine.

In the control unit 40, when the shift range is switched and the environmental temperature of the detent lever 21 is lower than the predetermined temperature, the maximum value of the rotary torque for rotating the detent lever 21 is assumed to be the predetermined value. By rotation of the detent lever 21 with the maximum value of the rotary torque limited to the predetermined value, the detent roller 222 remaining on the inner wall 213 of the engagement groove 211 can move in the direction to the bottom Bp1 of the engagement groove 211, but the detent roller 222 having once reached the bottom Bp1 of the engagement groove 211 cannot again move along the inner wall 214 of the engagement groove 211. Accordingly, even when the hydraulic oil has such relatively high viscosity that the detent roller 222 cannot move by biasing force, it is possible to move the detent roller 222 to the bottom Bp1 of the engagement groove 211 and reliably position the detent roller 222 at the bottom Bp1 of the engagement groove 211. It is thereby possible to improve the accuracy in positioning of the spool 251 with respect to the valve body 252 in the manual valve 25.

Further, the motor drive 433 controls the motor 11 such that the acting force Fmx derived by Relational Expression (1) acts on the detent roller 222. Accordingly, even when the hydraulic oil has such relatively high viscosity that acts on the detent roller 222, the detent roller 222 can reliably reach the bottom Bp1 of the engagement groove 211. Further, the detent roller 222 having passed along the inner wall surface 213 and reached the bottom Bp1 can be prevented from passing through the bottom Bp1 and moving up the inner wall surface 214. It is thus possible to reliably stop the detent roller 222 at the bottom Bp1 of the engagement groove 211.

The motor driver 444 sets as the target rotation position a pass point P213 in the stop range As21 set in S103 before execution of the current limit control in S107, and rotates the detent lever 21 by F/B control. Hence, the detent roller 222 can be made to reach the bottom Bp1 of the engagement groove 211 relatively fast as compared to the case of executing the current limit control, in which only relatively small acting force acts immediately after the determination in S102. It is thus possible to position the spool 251 relatively early with respect to the valve body 252.

Here, the stop range As21 is set on the inner wall surface 213 that forms the engagement groove 211 more front than the bottom Bp1 of the engagement groove 211 to be engaged with the detent roller 222 being engaged in the detent lever 21 as seen from the detent roller 222. Accordingly, the detent roller 222 engaged in the detent lever 21 can reach the bottom Bp1 of the engagement groove 211 to be engaged with the detent roller 222 at the shortest distance. It is thus possible to position the spool 251 relatively early with respect to the valve body 252.

When the rotation determining unit 443 determines that the encoder value is stagnating at the encoder value Bp1 during execution of the current limit control, the motor driver 444 stops the current application to the motor 11. Hence, it is possible to prevent separation of detent roller 222 from the bottom Bp1 of the engagement groove 211 due to erroneous operation of the motor 11, or the like.

When the shift range is switched in S101 and the environmental temperature of the detent lever 21 is determined to be not lower than the predetermined temperature in S102, the motor driver 444 rotates the detent lever 21 by the "predetermined angle" by the open drive for one count. After the rotation by the "predetermined angle", the rotation determining unit 443 determines whether the motor 11 has rotated to the target rotation position. When the rotation determining unit 443 determines that the encoder value has not rotated to the target rotation position, the open drive is executed again. Therefore, when the environmental temperature of the detent lever 21 is not lower than the predetermined temperature, the control unit 40 can make the detent roller 222 reach the bottom Bp1 relatively early.

Other Embodiments

It has been described in the foregoing embodiment that the motor driver 444 controls the motor 11 such that the acting force Fmx derived by Relational Expression (1) acts on the detent roller 222. However, the motor driver may simply supply, to the motor, power with the maximum value of the rotary torque for rotation of the detent lever assumed to be the predetermined value.

It has been described in the foregoing embodiment that the motor is a switched reluctance motor, and the control unit 40 is provided with the encoder that outputs a pulse signal synchronized with rotation of the switched reluctance motor, and the rotation determining unit. However, the type of the motor is not restricted thereto, and the encoder and the rotation determining unit may not be provided.

It has been described in the foregoing embodiment that, when the rotation determining unit 443 determines that the encoder value is within the stop range As21, the motor driver 444 executes the current limit control. However, the determination by the rotation determining unit 443 may not be performed. The current limit control may be executed based on the determination of the temperature of the hydraulic oil in S102. Further, it has been described that the stop range As21 is the range set on the inner wall surface 213 and is the range not including the bottom Bp1. However, it may be a range set on the inner wall surface 214 and be a range not including the bottom Bp1.

It has been described in the foregoing embodiment that the stop range in S103 and the stop range in S113 are the same stop range As21. However, those stop ranges may be different. They may simply be formed on the inner wall surface 213 including the pass point P213.

It has been described in the foregoing embodiment that, when the rotation determining unit 443 determines that the encoder value is the encoder value Bp1 during execution of the current limit control, the motor driver 444 stops the current application to the motor 11. However, the stoppage of the current application to the motor 11 is not restricted thereto.

It has been described in the foregoing embodiment that each of the sucking force F1, F2 is acting force obtained by synthesizing the friction force between the detent roller 222 and the inner wall surface with the divided force in the direction parallel to the inner wall surface, divided from the biasing force of the platy member 221 biasing the detent roller 222 in the direction of the rotation center of the detent lever 21. However, the force constituting each of the sucking force F1, F2 is not restricted thereto.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other

What is claimed is:

1. A controller of an oil pressure control system for an automatic transmission, the oil pressure control system including:
   a manual valve having a sleeve and a spool reciprocally accommodated in the sleeve, and changing an oil passage for hydraulic oil to be supplied to the automatic transmission for automatically shifting a gear of a vehicle;
   a detent lever that is rotatably arranged and coupled to the spool, has a plurality of engagement grooves, and positions the spool with respect to the sleeve;
   an engagement member including an engagement unit engageable with the plurality of engagement grooves, and a bias unit that is not relatively displaceable with respect to the sleeve, and biases the engagement unit in a direction of a rotation center of the detent lever; and
   a motor rotating the detent lever,
   the controller comprising:
   a shift range detecting unit that detects a shift range selected by a driver of the vehicle, and outputs a signal in accordance with the shift range;
   a range switch determining unit that is electrically connected with the shift range detecting unit, and determines based on the signal outputted by the shift detection unit whether the shift range is switched;
   a temperature detecting unit that detects an environmental temperature of the detent lever, and outputs a signal in accordance with detected environmental temperature;
   a temperature determining unit that is electrically connected with the temperature detecting unit, and determines based on the signal outputted by the temperature detecting unit whether the environmental temperature of the detent lever is lower than a predetermined temperature; and
   a power controlling unit that is electrically connected with the range switch determining unit and the temperature determining unit, and supplies, to the motor, a power for setting a maximum value of a rotary torque of rotating the detent lever as a predetermined value of the rotary torque when the range shift determining unit determines that the shift range is switched and the temperature determining unit determines that the environmental temperature of the detent lever is lower than the predetermined temperature, wherein:
   the motor is a switched reluctance motor;
   the controller further comprises:
     an encoder that outputs a pulse signal synchronized with rotation of the switched reluctance motor, and
     a rotation determining unit that is electrically connected with the encoder and the power controlling unit, determines whether an encoder value, which is a count value outputted by the encoder, is disposed in a predetermined range of encoder values or is a predetermined encoder value, and outputs a signal, in accordance with a determination result of the rotation determining unit, to the power controlling unit; and
   the power controlling unit controls a current for energizing the motor based on the determination result by the rotation determining unit;
   when the engagement unit moves in a direction to a bottom of one of the engagement grooves along a front-side inner wall that provides another one of the engagement grooves disposed on a near side of the bottom of the one of the engagement grooves with respect to the engagement unit engaged with the detent lever, an acting force for acting on the engagement unit in the direction to the bottom of the one of the engagement grooves is defined as F1;
   when the engagement unit moves in the direction to the bottom of the one of the engagement grooves along a rear-side inner wall that provides further another one of the engagement grooves disposed on a far side of the bottom of the one of the engagement grooves with respect to the engagement unit engaged with the detent lever, an acting force for acting on the engagement unit in the direction to the bottom of the one of the engagement grooves is defined as F2;
   when the fluid is disposed around the detent lever with an environmental temperature of the detent lever, an acting force according to a viscosity resistance of a fluid acting on the engagement unit is defined as F3;
   the rotary torque of the detent lever is set as the predetermined value when an acting force defined as Fmx acts on the engagement unit;
   Fmx satisfies a relationship of:

$$F3-F1<Fmx<F3+F2.$$

2. The controller of the oil pressure control system for the automatic transmission according to claim 1, wherein:
   when the rotation determining unit determines that the encoder value is disposed in the predetermined range, the power controlling unit limits the power to be supplied to the motor.

3. The controller of the oil pressure control system for the automatic transmission according to claim 2, wherein:
   the predetermined range of the encoder value corresponds to a position of a front-side inner wall that provides another one of the engagement grooves disposed on a near side of a bottom of one of the engagement grooves with respect to the engagement unit engaged with the detent lever.

4. The controller of the oil pressure control system for the automatic transmission according to claim 1, wherein:
   when the range switch determining unit determines that the shift range is switched and the temperature determining unit determines that the environmental temperature of the detent lever is not lower than the predetermined temperature, the power controlling unit supplies power to the motor that the detent lever rotates by a predetermined angle.

5. The controller of the oil pressure control system for the automatic transmission according to claim 1, wherein:
   before supplying, to the motor, the power for setting the maximum value of the rotary torque of rotating the detent lever as the predetermined value of the rotary torque, the power controlling unit controls the power to be supplied to the motor that the engagement unit reaches a point disposed on a front-side inner wall that provides another one of the engagement grooves disposed on a near side of a bottom of one of the engagement grooves with respect to the engagement unit engaged with the detent lever.

6. The controller of the oil pressure control system for the automatic transmission according to claim 2, wherein:
   when the power to be supplied to the motor is limited, the power controlling unit stops energizing the motor in a case where the rotation determining unit determines that the encoder value is the predetermined encoder value.

\* \* \* \* \*